United States Patent
Hsu

(10) Patent No.: US 11,988,876 B2
(45) Date of Patent: May 21, 2024

(54) FIBER OPTIC CONNECTOR

(71) Applicant: Gloriole Electroptic Technology Corp., Kaohsiung (TW)

(72) Inventor: Hsien-Hsin Hsu, Kaohsiung (TW)

(73) Assignee: GLORIOLE ELECTROPTIC TECHNOLOGY CORP., Kaohsiung (TW)

( * ) Notice: Subject to any disclaimer, the term of this patent is extended or adjusted under 35 U.S.C. 154(b) by 434 days.

(21) Appl. No.: 17/508,015

(22) Filed: Oct. 22, 2021

(65) Prior Publication Data
US 2022/0236491 A1    Jul. 28, 2022

(30) Foreign Application Priority Data
Jan. 22, 2021   (TW) ................. 110200830

(51) Int. Cl.
*G02B 6/38*   (2006.01)

(52) U.S. Cl.
CPC ........... *G02B 6/3825* (2013.01); *G02B 6/387* (2013.01); *G02B 6/3885* (2013.01); *G02B 6/3897* (2013.01)

(58) Field of Classification Search
CPC ....................................................... G02B 6/38
USPC ........................................................ 385/78
See application file for complete search history.

(56) References Cited

U.S. PATENT DOCUMENTS

| | | | | |
|---|---|---|---|---|
| 9,028,154 B2* | 5/2015 | Hui | ........................ | G02B 6/36 |
| | | | | 385/134 |
| 9,400,357 B2* | 7/2016 | Kato | .................... | G02B 6/3874 |
| 2009/0269014 A1* | 10/2009 | Winberg | .............. | G02B 6/3846 |
| | | | | 385/78 |
| 2018/0292612 A1* | 10/2018 | Chang | .................. | G02B 6/3893 |
| 2018/0292616 A1* | 10/2018 | Chang | .................. | G02B 6/3898 |
| 2018/0292618 A1* | 10/2018 | Chang | .................. | G02B 6/3874 |
| 2019/0025523 A1* | 1/2019 | Coenegracht | .......... | G02B 6/389 |
| 2019/0310432 A1* | 10/2019 | Chang | .................. | G02B 6/3874 |
| 2019/0377139 A1* | 12/2019 | Chang | .................. | G02B 6/3898 |
| 2020/0183093 A1* | 6/2020 | Chang | .................. | G02B 6/3825 |
| 2020/0285001 A1* | 9/2020 | Childers | .............. | G02B 6/3893 |
| 2021/0239919 A1* | 8/2021 | Chang | .................. | G02B 6/3825 |
| 2023/0012292 A1* | 1/2023 | Cloud | ................ | G02B 6/38875 |
| 2023/0350136 A1* | 11/2023 | Higley | .................. | G02B 6/403 |

* cited by examiner

*Primary Examiner* — Kaveh C Kianni
(74) *Attorney, Agent, or Firm* — MUNCY, GEISSLER, OLDS & LOWE, P.C.

(57) ABSTRACT

A fiber optic connector includes: a front casing that includes a front stopping portion defining a receiving space, and two side stopping portions extending respectively from opposite sides of the front stopping portion, and each being formed with an engaging slot; and a rear casing that is provided for the front casing to be detachably connected thereto, and includes a main body portion defining two through slots which are in spatial communication with the receiving space, and two engaging portions protruding respectively from opposite sides of the main body portion, and each engaging the engaging slot of a respective one of the side stopping portions and disengagable from the same through manual operation.

4 Claims, 3 Drawing Sheets

FIBER OPTIC CONNECTOR

CROSS-REFERENCE TO RELATED APPLICATION

This application claims priority of Taiwanese Patent Application No. 110200830, filed on Jan. 22, 2021.

FIELD

The disclosure relates to a connecting device, and more particularly to a fiber optic connector supporting a four-channel interface.

BACKGROUND

With the increasing advancement in data transmission technology, fiber optic connectors for high-speed fibers are matching up with new specifications, such as Quad Small Form-factor Pluggable (QSFP) interfaces, while also striving in the direction of form factor miniaturization and component simplification. However, taking into account the capacity of accommodating two ferrules and the requirement of the ferrules being detachable, conventional fiber optic connectors on the market have to include three or more detachable components, which results in inefficient processes of installing and removing the ferrules. Thus, the conventional fiber optic connectors are still in need of improvement.

SUMMARY

Therefore, the object of the disclosure is to provide a fiber optic connector having minimized number of detachable components.

According to the disclosure, the fiber optic connector includes a front casing and a rear casing.

The front casing includes a front stopping portion defining and surrounding a receiving space which extends along a front-rear direction, and two side stopping portions extending rearwardly and respectively from opposite sides of the front stopping portion which are opposite in a left-right direction transverse to the front-rear direction, and each being formed with an engaging slot.

The rear casing is disposed behind the front casing, is provided for the front casing to be detachably connected thereto along the front-rear direction, and includes a main body portion defining and surrounding two through slots which are in spatial communication with the receiving space, and two engaging portions protruding outwardly and respectively from opposite sides of the main body portion which are opposite in the left-right direction, and each engaging the engaging slot of a respective one of the side stopping portions and disengagable from the engaging slot of the respective one of the side stopping portions through manual operation.

The advantages of the present invention reside in that the fiber optic connector is designed as two engagable pieces, i.e., the assembly thereof requires only engaging the front casing with the rear casing. The resilient plate may be omitted in the embodiment, and even if the resilient plate is included, the resilient plate is connected integrally to the rear casing without additional assembly. Thus, the invention is still a simple design having two engagable pieces, which reduces the number of detachable components to a minimum, and a similar effect of accommodating respectively a plurality of ferrules in the through slots can still be achieved.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
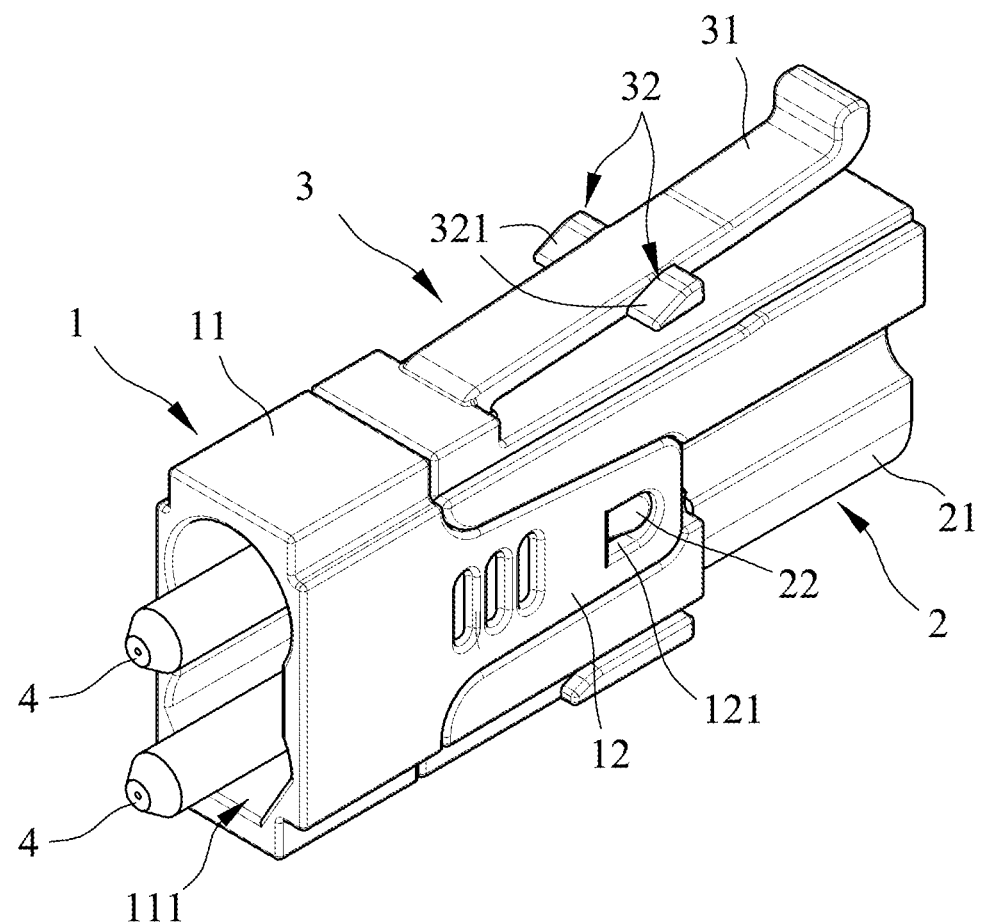
FIG. 1 is an assembled perspective view, illustrating an embodiment of a fiber optic connector and two ferrules according to the disclosure.
Figure 2:
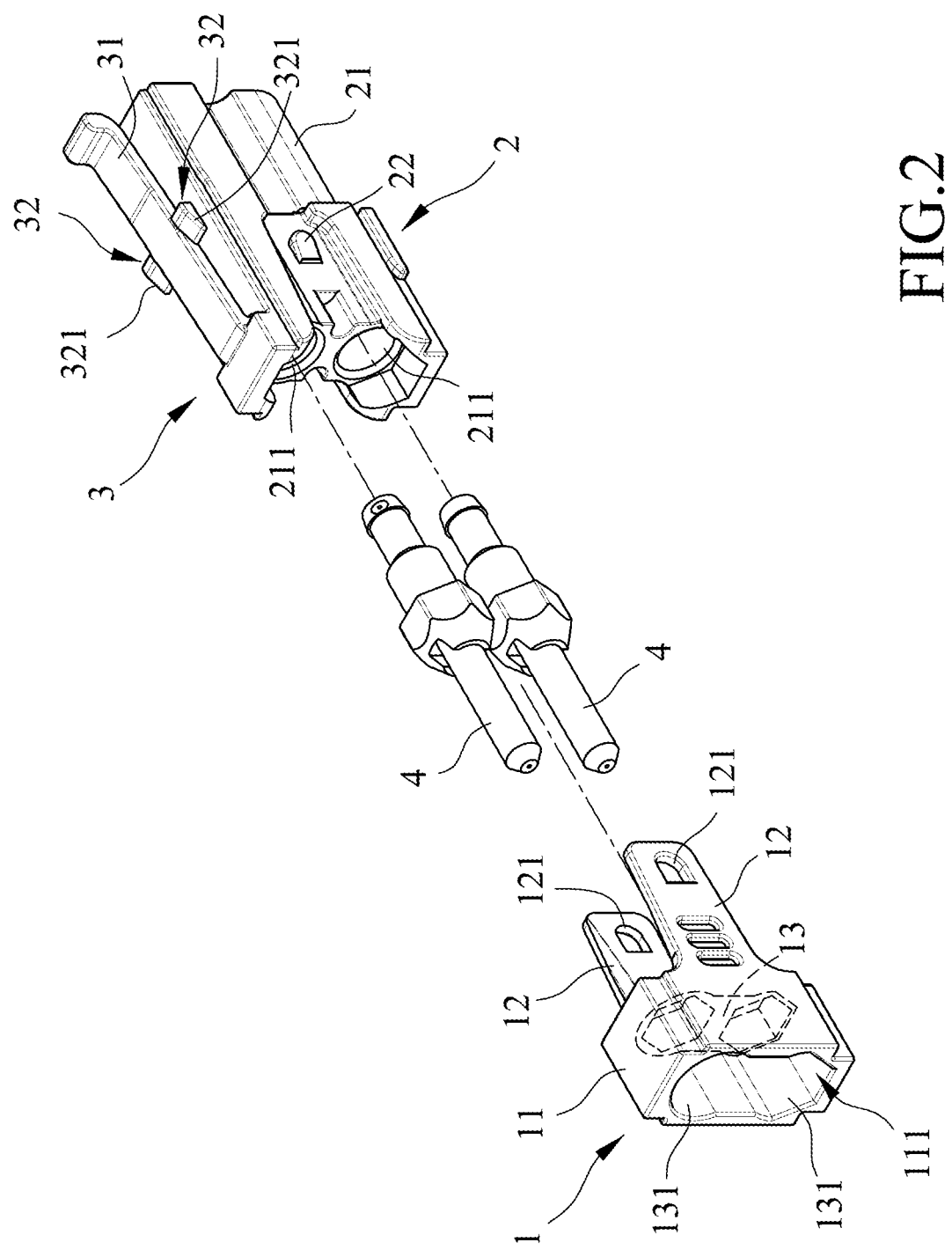
FIG. 2 is an exploded perspective view, illustrating relationships between each component of the embodiment and the ferrules.
Figure 3:
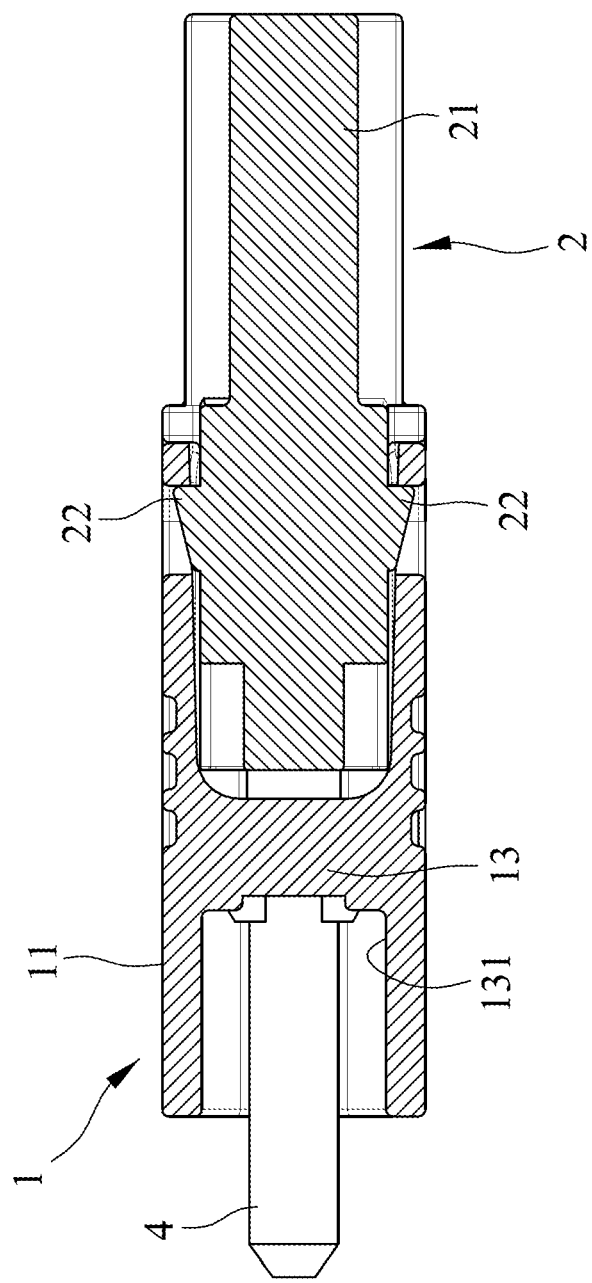
FIG. 3 is atop sectional view of the embodiment and the ferrules.

Referring to FIGS. 1, 2, and 3, an embodiment of a fiber optic connector according to the disclosure is adapted to be installed with two ferrules 4. It should be noted that, a front-rear direction is defined in reference to the direction of insertion (i.e., plugging direction) of the fiber optic connector, and a left-right direction is defined as being substantially perpendicular to the front-rear direction.

The fiber optic connector includes a front casing 1, a rear casing 2 that is disposed behind and detachably connected to the front casing 1 along the front-rear direction, and a resilient plate 3 that is obliquely and integrally connected to the rear casing 2, and that extends upwardly and rearwardly from the rear casing 2.

The front casing 1 includes a front stopping portion 11, two side stopping portions 12 and a dividing portion 13. The front stopping portion 11 defines and surrounds a receiving space 111 extending along the front-rear direction. The side stopping portions 12 extend rearwardly and respectively from opposite sides of the front stopping portion 11 along the left-right direction, and each of the side stopping portions 12 is formed with an engaging slot 121. The dividing portion 13 is disposed in the receiving space 111 and extends in the left-right direction. The engaging slot 121 of each of the side stopping portions 12 extends through opposite surfaces of the side stopping portion 12 in the left-right direction. The dividing portion 13 divides the receiving space 111 into two through holes 131 that are arranged vertically and that are in spatial communication with the external environment.

The rear casing 2 includes a main body portion 21 and two engaging portions 22. The main body portion 21 defines and surrounds two through slot 211 arranged vertically. The engaging portions 22 protrude outwardly and respectively from opposite sides of the main body portion 21 which are opposite in the left-right direction. Each of the engaging portions 22 engages the engaging slot 121 of a respective one of the side stopping portions 12, and is disengagable from the engaging slot 121 of the respective one of the side stopping portions 12 through manual operation. The through slots 211 are in spatial communication with the through holes 131, respectively.

The resilient plate 3 is integrally connected to a top surface of the main body portion 21 of the rear casing 2, and includes a plate body portion 31 that is connected to the main body portion 21 of the rear casing 2, and two inclined block portions 32 that extend outwardly and respectively from opposite sides of the plate body portion 31 which are opposite in the left-right direction. Each of the oblique block portion 32 has an oblique surface 321 that faces away from the main body portion 21 of the rear casing 2, and that is inclined rearwardly and outwardly relative to the plate body portion 31.

When assembling the embodiment, the ferrules 4 are first disposed respectively in the through slots 211 of the rear casing 2. Then, the rear casing 2 and the front casing 1 are moved toward each other, such that each of the engaging portions 22 of the rear casing 2 extends into the engaging slot 121 of a respective one of the side stopping portions 12 of the front casing 1, and a front portion of each of the ferrules 4 extends out of the respective one of the through holes 131 in the front-rear direction, such that the assembly is completed.

When the fiber optic connector is to be disassembled, it is only necessary to press the engaging portions 22 in the engaging slots 121 inwardly, such that each of the engaging portions 22 no longer engages the engaging slot 121 of the respective one of the side stopping portions 12. Then, the front casing 1 is moved forward such that the front casing 1 becomes detached from the rear casing 2. As such, the fiber optic connector is quickly disassembled. Furthermore, the design of the oblique surface 321 of each of the oblique block portions 32 of the resilient plate 3 is adapted to create a guiding effect during insertion of the fiber optic connector into an adapter (not shown).

In sum, by virtue of the fiber optic connector of the present disclosure being designed as two engagable pieces, the assembly thereof requires only engaging the front casing with the rear casing. The resilient plate may be omitted in the embodiment, and even if the resilient plate is included, the resilient plate is connected integrally to the rear casing without additional assembly. Thus, the invention is still a simple design having two engagable pieces, which minimizes the number of detachable components and reduces space occupied thereby, resulting in simplified configuration and miniaturized form factor. Since the assembling and disassembling processes of the fiber optic connector are quick and easy, the purpose of the invention can indeed be achieved.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A fiber optic connector comprising:
    a front casing that includes a front stopping portion defining and surrounding a receiving space which extends along a front-rear direction, and two side stopping portions extending rearwardly and respectively from opposite sides of said front stopping portion which are opposite in a left-right direction transverse to the front-rear direction, and each being formed with an engaging slot; and
    a rear casing that is disposed behind said front casing, that is provided for said front casing to be detachably connected thereto along the front-rear direction, and that includes a main body portion defining and surrounding two through slots which are in spatial communication with said receiving space, and two engaging portions protruding outwardly and respectively from opposite sides of said main body portion which are opposite in the left-right direction, and each engaging said engaging slot of a respective one of said side stopping portions and disengagable from said engaging slot of the respective one of said side stopping portions through manual operation.

2. The fiber optic connector as claimed in claim 1, further comprising a resilient plate that is obliquely and integrally connected to a top surface of said main body portion of said rear casing, and that extends upwardly and rearwardly from said top surface of said main body portion.

3. The fiber optic connector as claimed in claim 2, wherein said resilient plate includes a plate body portion connected to said main body portion of said rear casing, and two oblique block portions extending outwardly and respectively from opposite sides of said plate body portion which are opposite in the left-right direction, each of said oblique block portions having an oblique surface that faces away from said main body portion of said rear casing, and that is inclined rearwardly and outwardly relative to said plate body portion.

4. The fiber optic connector as claimed in claim 1, wherein said front casing further includes a dividing portion disposed in said receiving space and extending in the left-right direction, said dividing portion dividing said receiving space into two through holes that are in spatial communication with said through slots, respectively.

* * * * *